(12) United States Patent
Chen et al.

(10) Patent No.: US 9,306,705 B2
(45) Date of Patent: Apr. 5, 2016

(54) METHOD, DEVICE AND SYSTEM FOR ASSIGNING ACK CHANNELS TO USERS

(71) Applicant: HUAWEI TECHNOLOGIES CO., LTD., Shenzhen, Guangdong (CN)

(72) Inventors: Xiaobo Chen, Beijing (CN); Guang Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/732,159

(22) Filed: Jun. 5, 2015

(65) Prior Publication Data

US 2015/0271797 A1    Sep. 24, 2015

Related U.S. Application Data

(63) Continuation of application No. 14/104,782, filed on Dec. 12, 2013, now Pat. No. 9,054,867, which is a continuation of application No. 13/550,317, filed on Jul. 16, 2012, now Pat. No. 8,665,814, which is a (Continued)

(30) Foreign Application Priority Data

Apr. 29, 2008  (CN) .......................... 2008 1 0067047
Jun. 2, 2008    (CN) .......................... 2008 1 0108466

(51) Int. Cl.
*H04L 5/02*  (2006.01)
*H04L 1/16*  (2006.01)
(Continued)

(52) U.S. Cl.
CPC ............ *H04L 1/1607* (2013.01); *H04L 1/1854* (2013.01); *H04L 1/1861* (2013.01);
(Continued)

(58) Field of Classification Search
CPC .................................................. H04L 1/1607
See application file for complete search history.

(56) References Cited

U.S. PATENT DOCUMENTS

| 7,158,802 B2 | 1/2007 | Dick et al. |
| 8,644,232 B2 | 2/2014 | Li et al. |

(Continued)

FOREIGN PATENT DOCUMENTS

| CN | 1748435 A | 3/2006 |
| CN | 101127581 A | 2/2008 |

(Continued)

OTHER PUBLICATIONS

NEC Group, "PUCCH Allocation for ACK/NACK Transmission" 3GPP TSG RAN WG1 Meeting #50, R1-073462, Aug. 20-24, 2007.*

(Continued)

*Primary Examiner* — Joseph Bednash
(74) *Attorney, Agent, or Firm* — Huawei Technologies Co., Ltd.

(57) ABSTRACT

A method for assigning acknowledgement (ACK) channels to a user is used to feed back ACKs of a plurality of downlink sub-frames in one uplink sub-frame. According to the method, reserved ACK channels are divided into blocks according to the number of downlink sub-frames; each downlink sub-frame corresponds to one block; each block is divided into several sub-blocks; control channel element (CCE) sets within the same sub-frame are respectively mapped to different sub-blocks; and the ACK channels are assigned to the downlink sub-frames according to a sequence of increasing a mapping label d first and then increasing a sub-block label m. Thus, more unused ACK channels can be released to form resource blocks (RBs) for transmission on other channels, for example, for PUSCH transmission. Other methods for assigning ACK channels to a user, a device for assigning ACK channels to a user, and a communication system are further provided.

12 Claims, 5 Drawing Sheets

ACK channel labels:

ACK channels mapped to the downlink sub-frame 0

ACK channels mapped to the downlink sub-frame 1

ACK channels that are not mapped

Related U.S. Application Data continuation of application No. 12/543,005, filed on Aug. 18, 2009, now Pat. No. 8,243,669, which is a continuation of application No. PCT/CN2009/071124, filed on Apr. 1, 2009.

(51) Int. Cl.
| | |
|---|---|
| *H04L 1/18* | (2006.01) |
| *H04L 5/00* | (2006.01) |
| *H04L 1/00* | (2006.01) |
| *H04W 72/04* | (2009.01) |
| *H04W 88/08* | (2009.01) |

(52) U.S. Cl.
CPC ............ *H04L5/0053* (2013.01); *H04L 5/0055* (2013.01); *H04L 5/02* (2013.01); *H04W 72/042* (2013.01); *H04W 72/0446* (2013.01); *H04L 1/0071* (2013.01); *H04W 72/0406* (2013.01); *H04W 88/08* (2013.01)

(56) References Cited

U.S. PATENT DOCUMENTS

| | | |
|---|---|---|
| 9,054,867 B2 | 6/2015 | Chen et al. |
| 2004/0009780 A1 | 1/2004 | Dick et al. |
| 2004/0224697 A1 | 11/2004 | Hakkinen et al. |
| 2005/0201319 A1 | 9/2005 | Lee et al. |
| 2007/0081491 A1 | 4/2007 | Kim et al. |

FOREIGN PATENT DOCUMENTS

| | | | |
|---|---|---|---|
| CN | 101127584 | A | 2/2008 |
| CN | 101222291 | A | 7/2008 |
| CN | 101505497 | A | 8/2009 |
| CN | 102047712 | A | 5/2011 |
| EP | 1775874 | A2 | 4/2007 |
| JP | 2003528506 | A | 9/2003 |
| KR | 20060082129 | A | 7/2006 |
| KR | 20080008480 | A | 1/2008 |
| WO | 0172080 | A1 | 9/2001 |
| WO | 2004072673 | A2 | 8/2004 |
| WO | 2008111808 | A1 | 9/2008 |

OTHER PUBLICATIONS

Nokia Siemens Networks, Nokia, "ACK/NACK Bundling Details for LTE TDD" 3GPP TSG RAN WG1 Meeting #53, R1-081858, May 5-9, 2008.*
LG Electronics, "Uplink ACK/NACK resource allocation in TDD" 3GPP TSG RAN WG1 #52bis, R1-081568, May 5-9, 2008.*
Samsung, "PHICH linking to downlink CCE" 3GPP TSG-RAN Working Group 1 #51bis, R1-080023, Jan. 14-18, 2008.*
Motorola et al. "ACK/NACK Bundling for TDD: Way Forward", 3GPP TSG RAN WG1 Meeting 53, R1-082100, May 5-9, 2008.*
Huawei et al. "Implicit Mapping between CCE and Pucch for ACK/NACK TDD", 3GPP TSG-RAN-WG1 Meeting #53bis, R1-082359, Jun. 30-Jul. 4, 2008.*
3GPP TSG-RAN WG1 #52 R1-080647,"UL ACK/NAK Resource Allocation",Qualcomm Europe,Feb. 11-15, 2008,total 3 pages.
3GPP TSG RAN WG1 Meeting #50bis R1-074169,"PUCCH allocation for ACK/NACK transmission",NEC Group, Oct. 8-12, 2007,total 5 pages.
3GPP TSG RAN WG1 Meeting #51 R1-074720,"Detail on mapping between ACK/NACK index and CCE index",NEC Group,Nov. 5-9, 2007,total 4 pages.
3GPP TSG RAN WG1 Meeting #52bis R1-081219,"CCE to uplink ACK/NACK mapping in TDD",Samsung, Mar. 31-Apr. 4, 2008,total 2 pages.
3GPP TSG RAN WG1 #52bis R1-081257 (R1-081568),"Uplink ACK/NACK resource allocation in TDD",LG Electronics, Mar. 31-Apr. 4, 2008,total 8 pages.
3GPP TSG RAN WG1 Meeting #53 R1-082095,"Implict mapping between CCE and PUCCH for ACK/NACK TDD", huawei,May 5-9, 2008,total 4 pages.
3GPP TSG-RAN-WG1 Meeting #53bis R1-082359,"Implict mapping between CCE and PUCCH for ACK/NACK TDD", Huawei et al.,Jun. 30-Jul. 4, 2008,total 4 pages.
3GPP TS 36.211 V8.2.0,3rd Generation Partnership Project;Technical Specification Group Radio Access Network; Evolved Universal Terrestrial Radio Access (E-UTRA);Physical Channels and Modulation(Release 8),Mar. 2008,total 65 pages.
3GPP TS 36.213 V8.2.0,3rd Generation Partnership Project;Technical Specification Group Radio Access Network; Evolved Universal Terrestrial Radio Access (E-UTRA);Physical layer procedures(Release 8),Mar. 2008,total 30 pages.
3GPP TSG RAN1#51-Bis R1-080082,"UL ACK/NACK Resource Provisioning",Motorola,Jan. 14-18, 2008,total 3 pages.
R1-082100 Agenda: 7.1.2,"ACK/NACK Bundling for TDD : Way Forward",Motorola et al.,May 5-9, 2008,total 6 pages.
3GPP TSG RAN WG1 Meeting #53 R1-081858,"ACK/NACK Bundling Details for LTE TDD",Nokia Siemens Networks, Nokia,May 5-9, 2008,total 9 pages.
3GPP TSG-RAN Working Group 1 #51bis R1-080023,"PHICH linking to downlink CCE",Samsung,Jan. 14-18, 2008,total 3 pages.
3GPP TSG RAN WG1 Meeting #50 R1-073462,"PUCCH allocation for ACK/NACK transmission",NEC Group,Aug. 20-24, 2007,total 4 pages.
TSG-RAN WG1 #38 R1-040683,"Enhanced Uplink—Scheduling",Ericsson, Jun. 21-24, 2004,total 6 pages.
TSG-RAN WG1 Rel-6 Adhoc R1-040698,"Description of EUL scheduler",Samsung, Jun. 21-24, 2004,total 8 pages.
3GPP TSG RAN WG1 Meeting #53 R1-081748,"CCE to uplink ACK/NACK mapping in TDD",Samsung, May 5-9, 2008,total 4 pages.
3GPP TSG RAN1#50-bis R1-074008,"UL ACK/NACK Resource Provisioning",Motorola,Oct. 8-12, 2007,total 3 pages.
3GPP TSG RAN WG1 Meeting #52 R1-080981,"Ack/Nack repetition and Implicit Resource Allocation for PUCCH", Panasonic, Feb. 11-15, 2008, total 2 pages.
3GPP TSG RAN WG1#52 R1-081003,"PUCCH ACK/NACK configuration and CCE index mapping", LG Electronics, Feb. 11-15, 2008, total 4 pages.

\* cited by examiner

ACK channel labels:

ACK channel labels:

0          $N_{CCE,2}-1$                    $N_{CCE,3}+N_{CCE,2}-1$ $2N_{CCE,3}-1$

ACK channels mapped to the downlink sub-frame 0

ACK channels mapped to the downlink sub-frame 1

ACK channels that are not mapped

METHOD, DEVICE AND SYSTEM FOR ASSIGNING ACK CHANNELS TO USERS

CROSS-REFERENCE TO RELATED APPLICATIONS

This application is a continuation of U.S. patent application Ser. No. 14/104,782, filed on Dec. 12, 2013, which is a continuation of U.S. patent application Ser. No. 13/550,317, filed on Jul. 16, 2012, now U.S. Pat. No. 8,665,814. The U.S. patent application Ser. No. 13/550,317 is a continuation of U.S. patent application Ser. No. 12/543,005, filed on Aug. 18, 2009, now U.S. Pat. No. 8,243,669. The U.S. patent application Ser. No. 12/543,005 is a continuation of International Application No. PCT/CN2009/071124, on filed Apr. 1, 2009, which claims the priority to Chinese patent application No. 200810067047.4, filed on Apr. 29, 2008, and Chinese patent application No. 200810108466.8, filed on Jun. 2, 2008, all of which are incorporated herein by reference.

FIELD OF THE INVENTION

The present invention relates to the field of mobile communication, and more particularly to a technique for assigning acknowledgement (ACK) channels to a user.

BACKGROUND OF THE INVENTION

In an existing $3^{rd}$ Generation Partnership Project (3GPP) Evolved Universal Terrestrial Radio Access (E-UTRA) system, network side equipment, for example, a base station (BS), delivers downlink control signaling before sending downlink data, so as to instruct a user to receive the downlink data from corresponding resources. Upon receiving the downlink data, the user feeds back an acknowledgement (ACK) if the downlink data is correctly received; otherwise, the user feeds back a negative-acknowledgement (NACK). User equipment (UE) that receives the downlink data may support two modes, namely, a frequency division duplex (FDD) mode and a time division duplex (TDD) mode.

For the UE that supports the TDD mode, channels for carrying the ACK/NACK feedback information of the user are ACK channels. The ACK channels are assigned by the network side according to a rule predefined by the system. The user has already acquired the predefined rule, and detects the assigned ACK channels according to the predefined rule, and then carries the feedback information on the channels and sends the feedback information to the network side equipment.

In the prior art, a frame structure in the TDD mode is generally as shown in FIG. 1. Each radio frame is 10 ms long, and consists of two half-frames that are respectively 5 ms long. Each half-frame consists of eight slots that are respectively 0.5 ms long and three special fields, DwPTS, GP, and UpPTS. Every two slots constitute one sub-frame, and the three special fields, DwPTS, GP, and UpPTS, constitute a special sub-frame. Each sub-frame is 1 ms long. Among the sub-frames, the sub-frames 0 and 5 are downlink sub-frames, the sub-frame 2 is an uplink sub-frame, DwPTS in the special sub-frame may transmit downlink data or may not transmit data, and the remaining sub-frames may be flexibly assigned as uplink sub-frames or downlink sub-frames.

Currently, seven downlink-to-uplink configurations are defined in the 3GPP E-UTRA system, including three configurations for the 5 ms downlink-to-uplink switch-point periodicity, namely, 1:3, 2:2, and 3:1; and four configurations for the 10 ms downlink-to-uplink switch-point periodicity, namely, 6:3, 7:2, 8:1, and 3:5. Except the two ratios of 1:3 and 3:5, all the other ratios are required to feed back ACKs or NACKs of N (N>1, N is an integer) downlink sub-frames in one uplink sub-frame. As known to those skilled in the art that, N>1 is a unique condition for the TDD mode, and the ACK/NACK assignment problem for a plurality of downlink sub-frames under this condition needs to be solved. Meanwhile, the solutions proposed under the condition of N>1 should also cater to the condition of N=1, so as to reduce the complexity of the system in the TDD mode.

As the time-frequency resources occupied by a physical downlink control channel (PDCCH) are measured by taking control channel elements (CCEs) as the unit, an ACK channel for ACK or NACK uplink feedback is implicitly mapped by a CCE with the smallest label occupied by the PDCCH. A commonly used implicit mapping mode is one-to-one mapping of CCE labels to ACK labels.

In the 3GPP system, the number of symbols n occupied by the PDCCH as indicated by a physical control format indicator channel (PCFICH) in each downlink sub-frame may be 1, 2, or 3; and as for the special sub-frame, n may be 1 or 2. The value of n for each sub-frame dynamically varies. In a downlink sub-frame, under the given system parameters such as system bandwidth and pilot antenna configuration remain constant, the greater the number n of symbols occupied by the PDCCH is, the more CCEs will exist in the downlink sub-frame. When n is 1, 2, and 3, the number of CCEs in the downlink sub-frame is represented by $N_{CCE,1}$, $N_{CCE,2}$, and $N_{CCE,3}$, and $N_{CCE,1} < N_{CCE,2} < N_{CCE,3}$.

According to the prior art, when it requires feeding back ACKs/NACKs of N downlink sub-frames in one uplink sub-frame, the network side assigns ACK channels to the user according to the following rule.

(1) Considering that n may be provided with different values, the network side reserves $f(N_{CCE,3})$ ACK channels for each downlink sub-frame (including the special sub-frame) according to the maximum CCE number, and adopts a manner of one-to-one mapping of CCEs to ACKs, in which $f(N_{CCE,3})=N_{CCE,3}$. The function f represents a mapping rule between CCE labels and ACK channel labels. For N sub-frames, a total number of $N \times N_{CCE,3}$ ACK channels are reserved.

(2) The $N \times N_{CCE,3}$ ACK channels are divided into N consecutive portions, and each downlink sub-frame is mapped to one portion according to the original sequence, and each portion has a size of $N_{CCE,3}$. For example, when it requires feeding back ACKs/NACKs of two downlink sub-frames in one uplink sub-frame, a corresponding mapping mode is as shown in FIG. 2, in which the maximum PCFICH values of downlink sub-frames 0 and 1 are both 3.

Difficulties can be experienced when implementing the foregoing rule to assign ACK channels, as unused ACK channels cannot be effectively released to form resource blocks (RBs) for the physical uplink shared channel (PUSCH) transmission.

SUMMARY OF THE INVENTION

Various embodiments of the present invention provide a technique for assigning ACK channels to a user, so that the required ACK channel resources are saved.

A method for assigning ACK channels to a user provided in one embodiment of the present invention is used to feed back ACKs of N downlink sub-frames in one uplink sub-frame. The method includes the following steps.

Firstly, reserved ACK channels are divided into N blocks; each downlink sub-frame is assigned with a mapping label d, in which each mapping label corresponds to one block; and each block is divided into a plurality of sub-blocks, and each sub-block is assigned with a sub-block label m.

Then, the ACK channels are assigned to the downlink sub-frames according to a sequence of increasing the mapping label d first and then increasing the sub-block label m. Here, N is a positive integer.

A method for assigning ACK channels to a user provided in one embodiment of the present invention is used to feed back ACKs of N downlink sub-frames in one uplink sub-frame. The method includes the following steps.

ACK channels are assigned to the downlink sub-frames using the following equation according to a sequence of increasing a mapping label d first and then increasing a sub-block label m:

$$n_{PUCCH}^{(1)} = (N-d-1) \times \text{INTEGER}(N_{CCE,m}/K) + d \times \text{INTEGER}(N_{CCE,m+1}/K) + \lfloor n_{CCE}/K \rfloor.$$

In the above equation, $n_{CCE}$ is a label of a CCE in a sub-frame, $n_{PUCCH}^{(1)}$ is a label of an ACK channel assigned to a CCE with a label of $n_{CCE}$ in a sub-frame with a mapping label d, $N_{CCE,m}$ represents the number of CCEs in the downlink sub-frame when n is equal to m, and K and N are positive integers.

A method for assigning ACK channels to a user provided in one embodiment of the present invention is used to feed back ACKs of N downlink sub-frames in one uplink sub-frame. In this method, reserved ACK channels are divided into N blocks; each downlink sub-frame corresponds to one block according to a preset sequence; each block is divided into a plurality of sub-blocks; and the ACK channels are assigned to the downlink sub-frames in a mode of mapping different CCE sets within the same sub-frame to different sub-blocks respectively.

A method for assigning ACK channels to a user provided in one embodiment of the present invention is used to feed back ACKs of a plurality of downlink sub-frames in one uplink sub-frame. According to the method, among reserved $$N \times N_{CCE,max\{Mi\}} \text{ or } \sum_{i=0}^{N-1} N_{CCE,Mi}$$

ACK channels, the ACK channels are consecutively mapped to each downlink sub-frame.

A method for assigning ACK channels to a user provided in one embodiment of the present invention is used to feed back ACKs of a plurality of downlink sub-frames in one uplink sub-frame. According to the method, reserved ACK channels are divided into N blocks; each downlink sub-frame is assigned with a mapping label d according to a preset rule, in which each mapping label corresponds to one block; each block is divided into a plurality of sub-blocks; and the ACK channels are assigned to the downlink sub-frames in a mode of mapping K consecutive CCEs to one ACK channel according to a sequence of increasing the mapping label d first and then increasing a sub-block label m. Here, K is an integer equal to or greater than 1.

A method for assigning ACK channels to a user provided in one embodiment of the present invention is used to feed back ACKs of a plurality of downlink sub-frames in one uplink sub-frame. According to the method, reserved ACK channels are divided into N blocks; the plurality of downlink sub-frames is assigned with the same mapping label d according to a preset rule, in which each mapping label corresponds to one block; each block is divided into a plurality of sub-blocks; and the ACK channels are assigned to the downlink sub-frames according to a sequence of increasing the mapping label d as first and then increasing a sub-block label m.

A device for assigning ACK channels to a user provided in one embodiment of the present invention includes a reservation unit and an assignment unit. The reservation unit is configured to reserve ACK channels for N downlink sub-frames. The assignment unit is configured to divide the reserved ACK channels into N blocks; assign each downlink sub-frame with a mapping label d according to a preset rule, in which each mapping label corresponds to one block; divide each block into a plurality of sub-blocks; and assign the ACK channels to the downlink sub-frames according to a sequence of increasing the mapping label d first and then increasing a sub-block label m.

A device for assigning ACK channels to a user provided in one embodiment of the present invention includes a reservation unit and an assignment unit. The reservation unit is configured to reserve $$N \times N_{CCE,max\{Mi\}} \text{ or } \sum_{i=0}^{N-1} N_{CCE,Mi}$$

ACK channels for N downlink sub-frames. The assignment unit is configured to assign the ACK channels to the downlink sub-frames in a mode of consecutively mapping ACK channels to each sub-frame among the reserved ACK channels.

A communication system provided in one embodiment of the present invention includes UE and any of the above devices. The device is located at a network side and configured to assign ACK channels to the UE. The UE feeds back ACK information of N downlink sub-frames to the network side on the assigned ACK channels.

A communication system provided in one embodiment of the present invention includes any of the above devices.

According to the embodiments of the present invention, the reserved ACK channels are divided into blocks according to the downlink sub-frames, each block is divided into a plurality of sub-blocks, and the CCE sets within the same sub-frame are respectively mapped to different sub-blocks, so as to release unused ACK channel resources as whole blocks to form more RBs for the transmission on other channels, for example, PUSCH transmission. Alternatively, ACK channels are consecutively mapped to each sub-frame among the reserved ACK channels, so as to release unused ACK channel resources as whole blocks, thereby saving the ACK channel resources. Alternatively, a plurality of consecutive CCEs is mapped to one ACK channel, or a plurality of downlink sub-frames is assigned with the same mapping label, so as to reduce the overhead of resource reservation, thereby saving the ACK channel resources.

BRIEF DESCRIPTION OF THE DRAWINGS

The present invention is described in detail below with reference to the accompanying drawings, in which.

DETAILED DESCRIPTION OF THE EMBODIMENTS

During the process of implementing the embodiments of the present invention, the inventor(s) found that, when the ACK channels are assigned to a user according to the prior art, the unused ACK channels cannot be effectively released to form RBs for the PUSCH transmission. For example, when ACKs/NACKs of two downlink sub-frames are fed back in one uplink sub-frame, and an actual value of n indicated by PCFICH of the sub-frame 0 is 1, labels of the ACK channels that may be actually used among ACK channels with labels of $0 \sim N_{CCE,3}-1$ that are mapped to the sub-frame 0 may be merely in the range of $0 \sim N_{CCE,1}-1$, and the other ACK channels with labels of $N_{CCE,1} \sim N_{CCE,3}-1$ cannot be occupied by implicit mapping. As a result, the resources occupied by such unused ACK channels cannot be released as whole blocks, that is, it is difficult for the idle resources to form RBs once being released.

Figure 1:
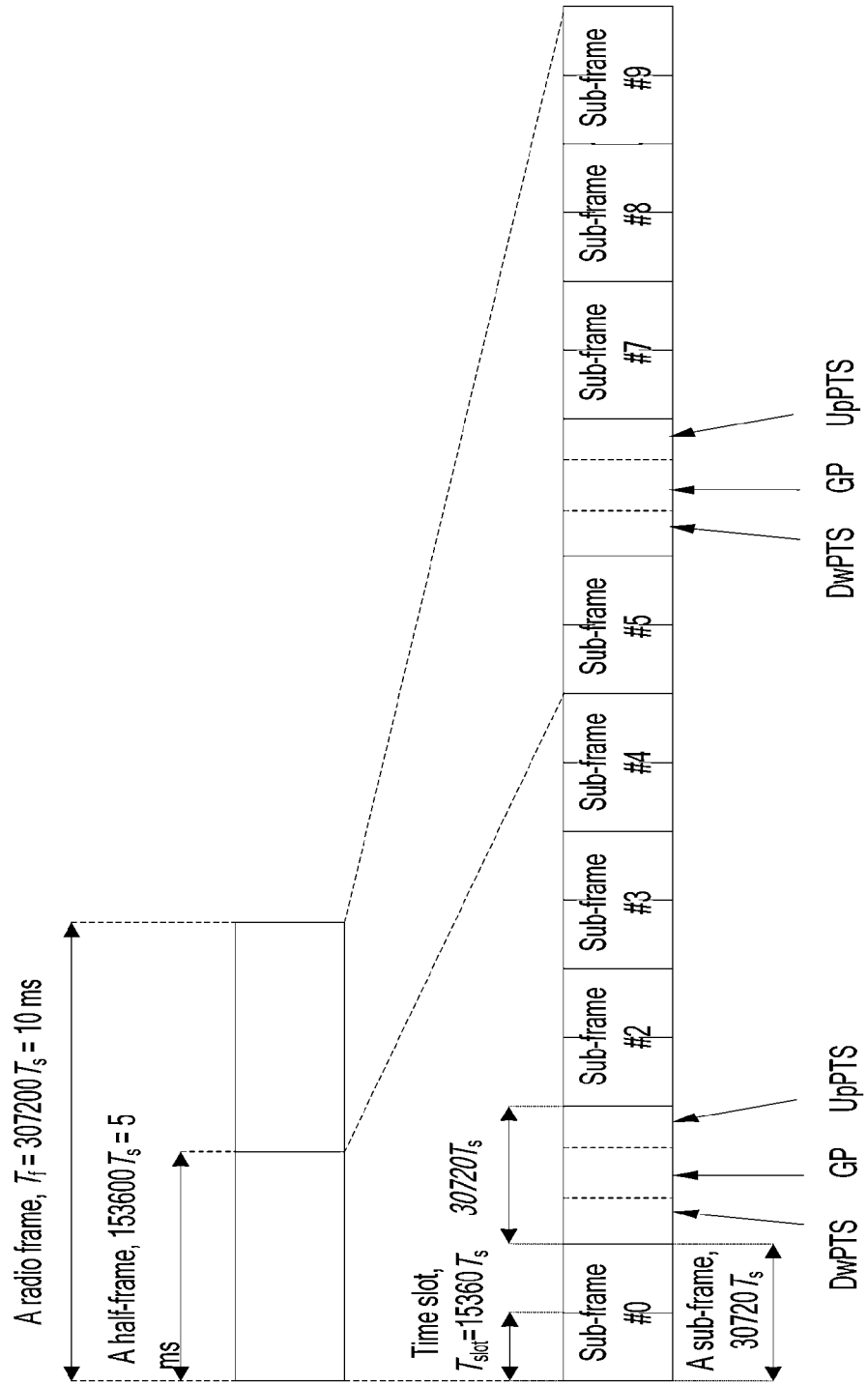
FIG. 1 is a schematic view of a frame structure in a TDD mode in the prior art.
Figure 2:
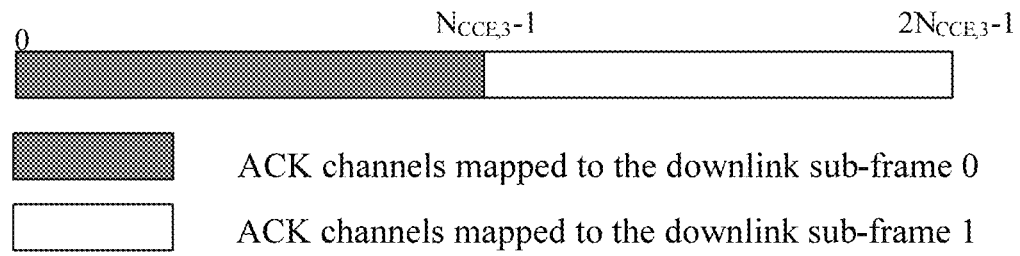
FIG. 2 is a schematic view of a mapping mode in the prior art.
Figure 3:
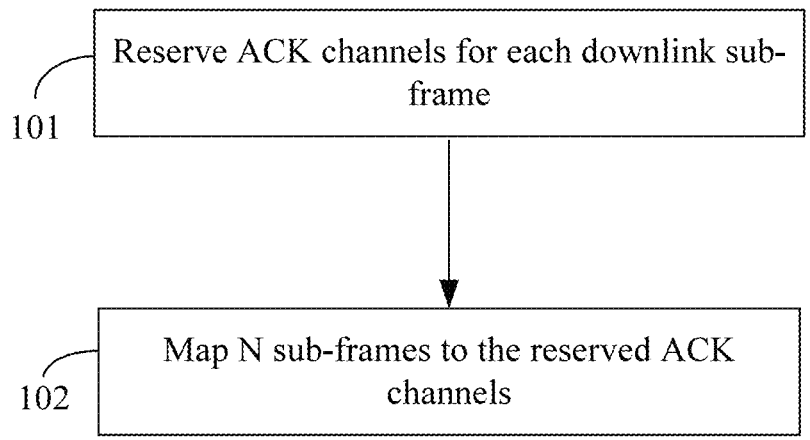
FIG. 3 is a schematic flow chart of a method according to an embodiment of the present invention.

In an embodiment of the present invention, as shown in FIG. 3, when it requires feeding back ACKs/NACKs of N downlink sub-frames in one uplink sub-frame, the network side assigns ACK channels to the user according to the following rule.

In Step 101, ACK channels are reserved for each downlink sub-frame. Considering that the value of n for each sub-frame varies dynamically, $N_{CCE,max\{Mi\}}$ ACK channels are reserved for each sub-frame (including the special sub-frame), so that a total number of $N \times N_{CCE,max\{Mi\}}$ channels are reserved. Here, Mi represents a maximum possible value of n for a downlink sub-frame with a label of i among N downlink sub-frames; i=0, 1, . . . , N−1; Max {Mi} represents a maximum value of Mi; and $N_{CCE,max\{Mi\}}$ represents the number of CCEs in the downlink sub-frame when n is equal to Max {Mi}.

For example, in the current 3GPP E-UTRA system, for the special sub-frame, n has a maximum value of 2, i.e., Mi=2; and for the other sub-frames, n has a maximum value of 3, i.e., Mi=3, so that Max {Mi} is 3. The number of ACK channels reserved for each sub-frame is $N_{CCE,3}$.

In Step 102, CCEs of N sub-frames are mapped to the reserved ACK channels. Specifically, the reserved ACK channels are divided into N blocks, and each block is divided into max{Mi} sub-blocks. For N downlink sub-frames, each sub-frame corresponds to one block in a preset sequence; and CCE sets with labels of $\{0, 1, \ldots, N_{CCE,3}-1\}$, $\{N_{CCE,1}, N_{CCE,1}+1, \ldots, N_{CCE,2}-1\}$, . . . , $\{N_{CCE,max\{Mi\}-1}, N_{CCE,max\{Mi\}-1}+1, \ldots, N_{CCE,max\{Mi\}}-1\}$ within the same sub-frame are respectively mapped to different sub-blocks.

The specific mapping process in Step 102 is illustrated below by taking the 3GPP E-UTRA system with Max {Mi}=3 as an example. Max {Mi}=3, i.e., each block is divided into 3 sub-blocks. The CCE sets with labels of $\{0, 1, \ldots, N_{CCE,1}-1\}$, $\{N_{CCE,1}, N_{CCE,1}+1, \ldots, (N_{CCE,2}-1)\}$, $\{N_{CCE,2}, (N_{CCE,2}+1), \ldots, (N_{CCE,3}-1)\}$ within the same sub-frame are respectively mapped to different sub-blocks.

In the mapping process, a sub-frame with a label of i (0≤i<N) among the N downlink sub-frames is assigned with a unique mapping label d according to a preset rule, so as to represent that the sub-frame is placed at a sub-frame position with a label of d during the mapping process, and 0≤d<N. The preset rule may be any one-to-one mapping from a set i= $\{0, 1, \ldots, N-1\}$ to a set d=$\{0, 1, \ldots, N-1\}$, for example, d=i; a mapping mode in which the special sub-frame is placed at the last position; or a mapping mode in which the sub-frame with the maximum actual value of n is placed at the foremost position, especially, a mapping mode in a sequence from the maximum actual value of n to the minimum actual value of n. $N_{CCE,m}$ represents the number of CCEs in the downlink sub-frame when the PCFICH value is m (0≤m≤max {Mi}−1), and it is defined that $N_{CCE,0}=0$. Labels of the ACK channels assigned after the mapping process are represented by $n_{PUCCH}^{(1)}$, and ($N \times N_{CCE,3}$) ACK channels reserved for the N downlink sub-frames are labeled as $0 \sim N*N_{CCE,3}-1$ respectively.

In this embodiment, a BS schedules certain UE on the sub-frame with the label of d among the N downlink sub-frames, and assigns a label $n_{CCE}$, (0≤$n_{CCE}$<$N_{CCE,3}$) to an initial CCE occupied by a PDCCH carrying a downlink scheduling assignment authorization command of the UE. Accordingly, the BS assigns an ACK channel label $n_{PUCCH}^{(1)}$ to the initial CCE according to the following process: firstly, according to the value of $n_{CCE}$, it is determined that a mapped ACK channel belongs to a sub-block with a label of m in the sub-frame with the label of d, in which the determination process includes selecting a value of m from m∈{0, 1, 2} to satisfy Equation (1) $N_{CCE,m} \leq n_{CCE} \leq N_{CCE,m+1}-1$; and then, the value of m obtained in the above step is substituted into Equation (2) $n_{PUCCH}^{(1)}=(N-d-1) \times N_{CCE,m}+d \times N_{CCE,m+1}+n_{CCE}$ to calculate the assigned ACK channel label.

Equation (2) is further illustrated as follows. When the channel corresponding to $n_{CCE}$ is located in the sub-block with the label of m (0≤m≤max {Mi}−1, for example, m=0, 1 or 2) in the sub-frame with the label of d, the first m sub-blocks (i.e., sub-blocks with labels of 0 to (m−1)) of all the N sub-frames are placed ahead thereof, and the first m sub-blocks correspond to $N \times N_{CCE,m}$ ACK channels; sub-blocks with the label of m in the first d sub-frames, i.e. sub-frames with labels of 0 to (d−1) among the N sub-frames are also placed ahead thereof, and the sub-blocks with the label of m correspond to $d \times (N_{CCE,m+1}-N_{CCE,m})$ ACK channels; and finally, in the sub-block with the label of m of the sub-frame with the label of d, ($n_{CCE}-N_{CCE,m}$) ACK channels corresponding to the first ($n_{CCE}-N_{CCE,m}$) CCEs are also placed ahead thereof. Equation (2) is obtained by summing the above three items together.

The UE detects the PDCCH carrying the downlink scheduling assignment authorization command of the UE on the sub-frame with the label of d, and gets to know that the label of the initial CCE occupied by the PDCCH is $n_{CCE}$, 0≤$n_{CCE}$<$N_{CCE,3}$. The UE gets to know the label $n_{PUCCH}^{(1)}$ of the ACK channel assigned to the initial CCE according to the following process: firstly, according to the value of $n_{CCE}$ it is determined that a mapped ACK channel belongs to a sub-block with a label of m in the sub-frame with the label of d, in which the determination process includes selecting a value of m from m∈{0, 1, 2} to satisfy Equation (1) $N_{CCE,m} \leq n_{CCE} \leq N_{CCE,m-1}-1$; and then, the value of m obtained according to Equation (1) is substituted into Equation (2) $n_{PUCCH}^{(1)}=(N-d-1) \times N_{CCE,m}+d \times N_{CCE,m+1}n_{CCE}$ to calculate the assigned ACK channel label.

The UE feeds back ACK/NACK information on the ACK channel with the label of $n_{PUCCH}^{(1)}$ and the BS detects the fed back ACK/NACK information on the ACK channel with the label of $n_{PUCCH}^{(1)}$. If the BS has scheduled the UE on a plurality of sub-frames among the N sub-frames, the BS assigns a plurality of ACK channel labels to the UE according to the above mapping mode, and the UE generally adopts the ACK channel corresponding to the initial CCE of the last detected PDCCH to feed back the ACK/NACK information.

In the 3GPP E-UTRA system, L ACK channels are code-division multiplexed on one RB, and generally, for a short-cycle prefix sub-frame structure, L=18. User data is scheduled from the RB only when the L ACK channels code-division multiplexed on the RB are not available. Therefore, adjustment factors may also be introduced in the division of sub-blocks for "fine adjustment", i.e., CCE sets with labels of $\{0, 1, \ldots, N_{CCE,1}-1-\Delta_1\}$, $\{N_{CCE,1}-\Delta_1, N_{CCE,1}-\Delta_1+1, \ldots, N_{CCE,2}-1-\Delta_2\}$, ..., $\{N_{CCE,max\{Mi\}-1}-\Delta_{max\{Mi\}-1}, N_{CCE,max\{Mi\}-1}-\Delta_{max\{Mi\}-1}+1, \ldots, N_{CCE,max\{Mi\}}-1\}$ within the sub-frame are respectively mapped to different sub-blocks. Here, $\Delta 1, \Delta 2, \ldots, \Delta max\{Mi\}-1$ are the adjustment factors, and values thereof are determined in a sequence of $\Delta max\{Mi\}-1, \ldots, \Delta 2$, and $\Delta 1$, which are generally not greater than 3. The introducing of the adjustment factors aims at forming one or more complete RBs when the number of ACK channels in different CCE sets of the same sub-frame is close to an integral multiple of L. In the above descriptions, "each sub-frame corresponds to one block in a preset sequence", in which the "preset sequence" may be an original sequence of the N downlink sub-frames, a sequence that the special sub-frame is placed at the last position, a sequence that the sub-frame with the maximum actual value of n is placed at the foremost position (if a plurality of sub-frames has the same n value, the plurality of sub-frames may be placed at the foremost positions according to a random sequence), or any other sequence that facilitates to release more unused ACK channels as whole blocks.

Figure 4:
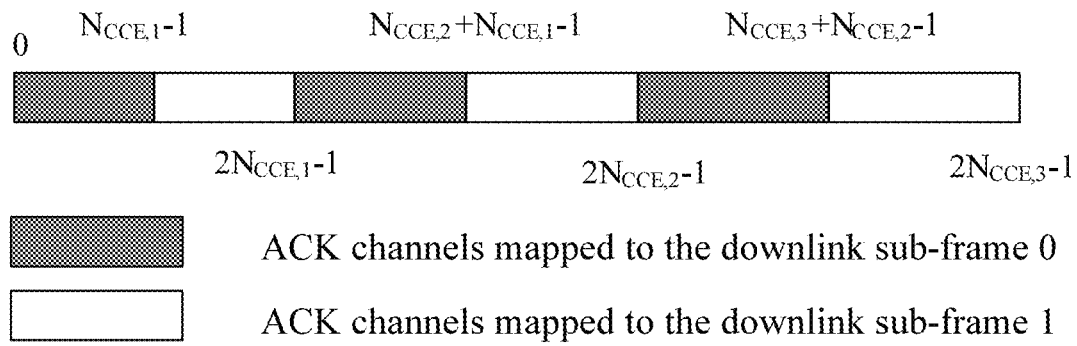
FIG. 4 is a schematic view of a mapping mode according to an embodiment of the present invention.

An example in which each sub-frame corresponds to one block according to the original sequence of the N sub-frames is as shown in FIG. 4.

In the example as shown in FIG. 4, it requires feeding back ACKs/NACKs of two downlink sub-frames in one uplink sub-frame, and the Mi for the two downlink sub-frames is 3. An actual value of n indicated by the PCFICH of the downlink sub-frame 0 is 3, and an actual value of n indicated by the PCFICH of the downlink sub-frame 1 is 2. Each of the downlink sub-frames 0 and 1 occupies one block sequentially in the original sequence, i.e., in the sequence that the sub-frame 0 is prior to the sub-frame 1. In the sub-frames 0 and 1, sub-blocks are further occupied sequentially according to labels. As shown in FIG. 4, the ACK channel resources with labels in the range of $\{(N_{CCE,3}+N_{CCE,2}) \sim (2N_{CCE,3}-1)\}$ may be released.

In an example, each sub-frame corresponds to one block in a sequence that the special sub-frame is placed at the last position. As the n for the special sub-frame has a maximum value of 2 in the existing 3 GPP system, more unused ACK channel resources can be released as whole blocks if the special sub-frame is placed at the last position.

Figure 5:
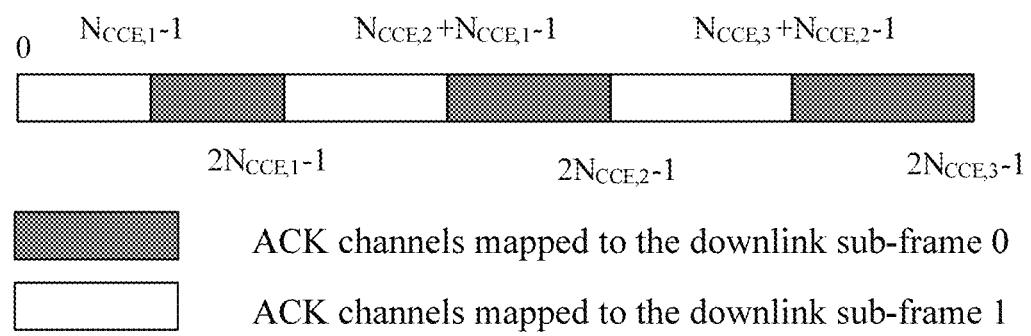
FIG. 5 is a schematic view of another mapping mode according to an embodiment of the present invention.

An example in which each sub-frame corresponds to one block in a sequence that the sub-frame with the maximum actual value of n is placed at the foremost position is as shown in FIG. 5.

In the example as shown in FIG. 5, it requires feeding back ACKs/NACKs of downlink sub-frames 0 and 1 in one uplink sub-frame, and the Mi for the two downlink sub-frames is 3. An actual value of n indicated by the PCFICH of the downlink sub-frame 0 is 2, and an actual value of n indicated by the PCFICH of the downlink sub-frame 1 is 3. As the value of n for the downlink sub-frame 1 is much greater, the downlink sub-frame 1 is placed at the foremost position. As shown in FIG. 5, the ACK channel resources with labels in the range of $\{(N_{CCE,3}+N_{CCE,2}) \sim (2N_{CCE,3}-1)\}$ may be released. If it requires feeding back ACKs/NACKs of more than two downlink sub-frames, each block may be preferably assigned to the sub-frames in a sequence from the maximum actual value of n to the minimum actual value of n for the sub-frames, so as to release more unused ACK resources as whole blocks.

In another embodiment, it requires feeding back ACKs/NACKs of N downlink sub-frames in one uplink sub-frame, and the network side assigns ACK channels to the user according to the following rule.

In Step a, $N_{CCE,Mi}$ ACK channels are reserved for each downlink sub-frame, and a total number of $$\sum_{i=0}^{N-1} N_{CCE,Mi}$$

ACK channels are reserved.

Different from Step 101, Step a reserves different number of ACK channels for each downlink sub-frame according to different Mi values thereof, rather than reserving $N_{CCE,max\{Mi\}}$ ACK channels for each sub-frame, so as to reduce the reserved ACK channel resources, thereby saving the system channel resources.

For example, when the Mi for the special sub-frame is 2 and the Mi for the other downlink sub-frames is 3, $N_{CCE,2}$ ACK channels are reserved for the special sub-frame, and $N_{CCE,3}$ channels are reserved for each of the other downlink sub-frames. As $N_{CCE,2}$ rather than $N_{CCE,3}$ ACK channels are reserved for the special sub-frame, the reserved ACK channel resources are reduced.

In Step b, N sub-frames are mapped to the reserved ACK channels. Specifically, the reserved ACK channels are divided into N blocks, and each block is divided into Mi sub-blocks. Each sub-frame corresponds to one block in a preset sequence. Sub-blocks belonging to different blocks are arranged in an interleaving manner. CCE sets with labels of $\{0, 1, \ldots, N_{CCE,1}-1\}$, $\{N_{CCE,1}, N_{CCE,1}+1, \ldots, (N_{CCE,2}-1)\}, \ldots, \{N_{CCE,Mi-1}, N_{CCE,Mi-1}+1, \ldots, N_{CCE,Mi}-1\}$ within the same sub-frame are respectively mapped to different sub-blocks. For example, as for the special sub-frame with Mi of 2, the corresponding block is divided into 2 sub-blocks, and CCE sets with labels of $\{0, 1, \ldots, N_{CCE,1}-1\}$, $\{N_{CCE,1}, N_{CCE,1}+1, \ldots, (N_{CCE,2}-1)\}$ within the sub-frame are respectively mapped to different sub-blocks. As for the sub-frames with Mi of 3, each block is divided into 3 sub-blocks, sub-blocks belonging to different blocks are arranged in an interleaving manner, and CCE sets with labels of $\{0, 1, \ldots, N_{CCE,1}-1\}$, $\{N_{CCE,1}, N_{CCE,1}+1, \ldots, (N_{CCE,2}-1)\}$, $\{N_{CCE,2}, (N_{CCE,2}+1), \ldots, (N_{CCE,3}-1)\}$ within the same sub-frame are respectively mapped to different sub-blocks.

For the 3GPP E-UTRA system, if one special sub-frame exists in the N sub-frames, the special sub-frame is preferably placed at the last position, that is, when the mapping label d is assigned to the sub-frame with the label of i, the special sub-frame is always assigned with d=N−1. Accordingly, in Step b, the BS and the UE determine an ACK channel label $n_{PUCCH}^{(1)}$ mapped to a CCE with a label of $n_{CCE}$ in the sub-frame with the label of d according to the following process: firstly, according to the value of $n_{CCE}$ it is determined that a mapped ACK channel belongs to a sub-block with a label of m in the sub-frame with the label of d, in which the determination process includes selecting a value of m from $m \in \{0, 1, 2\}$ to satisfy Equation (1) $N_{CCE,m} \leq n_{CCE} \leq$ $N_{CCE,m-1}-1$; and then, the value of m obtained in the above step is substituted into Equation (2) $n_{PUCCH}^{(1)}=(N-d-1)\times N_{CCE,m}+d\times N_{CCE,m+1}+n_{CCE}$ to calculate the assigned ACK channel label. It should be noted that, as only 2 sub-blocks exist for the special sub-frame, m actually cannot take the value of 2 in the above determination process of Equation (1), although m∈{0, 1, 2}; alternatively, it may also be defined in the determination process of Equation (1) that m∈{0, 1} for the special sub-frame.

Adjustment factors may also be introduced in the division of sub-blocks for "fine adjustment", i.e., CCE sets with labels of $\{0, 1, \ldots, N_{CCE,1}-1-\Delta_1\}$, $\{N_{CCE,1}-\Delta_1, N_{CCE,1}-\Delta_1, \ldots, N_{CCE,2}-1-\Delta_2\}$, ..., $\{N_{CCE,Mi-1}-\Delta_{Mi-1}, N_{CCE,Mi-1}-\Delta_{Mi-1}+1, \ldots, N_{CCE,Mi}-1\}$ within the sub-frame are respectively mapped to different sub-blocks. Here, $\Delta_1, \Delta_2, \ldots$, and $\Delta_{Mi-1}$ are the adjustment factors, and values thereof are determined in a sequence of $\Delta_{Mi-1}, \ldots, \Delta_2$, and $\Delta_1$, which are generally not greater than 3.

The preset sequence may be an original sequence of the N downlink sub-frames, a sequence that the special sub-frame is placed at the last position, or a sequence that the sub-frame with the maximum actual value of n is placed at the foremost position, in which the specific reference may be made to the above embodiment.

In still another embodiment, it requires feeding back ACKs/NACKs of N downlink sub-frames in one uplink sub-frame, and the network side assigns ACK channels to the user according to the following rule.

In Step a, ACK channels are reserved for each downlink sub-frame. $N_{CCE,Mi}$ or $N_{CCE,max\{Mi\}}$ ACK channels are reserved for each sub-frame, i.e., a total number of $$N \times N_{CCE,max\{Mi\}} \text{ or } \sum_{i=0}^{N-1} N_{CCE,Mi}$$

channels are reserved.

Figure 6:
FIG. 6 is a schematic view of still another mapping mode according to an embodiment of the present invention.
Figure 6:
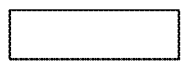
Figure 6:

In Step b, N sub-frames are mapped to the reserved ACK channels. Specifically, the ACK channels are consecutively mapped to each sub-frame. The N sub-frames may be arranged in a random sequence. An example is as shown in FIG. 6. In this example, it requires feeding back ACKs/NACKs of two downlink sub-frames in one uplink sub-frame, and the Mi for the two downlink sub-frames is 3. An actual value of n indicated by the PCFICH of the downlink sub-frame 0 is 2, and an actual value of n indicated by the PCFICH of the downlink sub-frame 1 is 3. After the sub-frame 0 is mapped to the ACK channels, the sub-frame 1 is mapped to the remaining ACK channels. The consecutive mapping mode can ensure that no unused ACK channels exist between the ACK channels where each sub-frame is mapped, thereby enabling more unused ACK channels to be released as whole blocks. In the example as shown in FIG. 6, the ACK channel resources with labels in the range of $\{(N_{CCE,3}+N_{CCE,2}) \sim (2N_{CCF,3}-1)\}$ may be released.

The released ACK channels with the labels in the range of $\{(N_{CCE,3}+N_{CCE,2}) \sim (2N_{CCE,3}-1)\}$ may form one or more complete RBs for the PUSCH transmission.

TABLE 1

| | Number of CCE | | | | | |
|---|---|---|---|---|---|---|
| | n = 1 | | n = 2 | | n = 3 | |
| System Bandwidth | 1 or 2 transmitting antennas | 4 transmitting antennas | 1 or 2 transmitting antennas | 4 transmitting antennas | 1 or 2 transmitting antennas | 4 transmitting antennas |
| 1.25 MHz | 0 | 0 | 2 | 1 | 4 | 3 |
| 5 MHz | 3 | 3 | 12 | 9 | 20 | 17 |
| 10 MHz | 8 | 8 | 25 | 19 | 41 | 36 |
| 20 MHz | 17 | 17 | 50 | 39 | 84 | 73 |

As shown in Table 1, under the situation that the system bandwidth is 20 MHz and 4 antennas are configured, and n takes values of 1, 2, and 3, $N_{CCE,1}=17$, $N_{CCE,2}=39$, and $N_{CCE,3}=73$. ACK channels with labels in the range of 112-145 can be released, that is, 34 ACK channels can be released. If one RB only can multiplex 18 ACK channels, at least one RB can be released for the PUSCH transmission.

In the above example, 34 ACK channels can be released. However, as L takes the value of 18, the remaining 16 ACK channels that are released cannot form a complete RB for the PUSCH transmission. In this case, "fine adjustment" may be performed to map the CCE set with the label of $\{N_{CCE,2}-\Delta_2, N_{CCE,2}-\Delta_2+1, \ldots, N_{CCE,3}-1\}$ to the last sub-block, and here, $\Delta_2$ takes a value of 2. As such, a total number of 36 ACK channels can be released, which can form 2 complete RBs for the PUSCH transmission.

In another example, how to determine the values of $\Delta_1$ and $\Delta_2$ during "fine adjustment" is illustrated. As shown in Table 1, under the situation that the system bandwidth is 10 MHz and 1 or 2 antennas are configured, and n takes values of 1, 2, and 3, $N_{CCE,1}=8$, $N_{CCE,2}=25$, and $N_{CCE,3}=41$. As 16 (=41−25) and 17 (=25−8) are close to L (=18), the value of $\Delta_2$ is set to 2 first, and then the value of $\Delta_1$ is set to 3, such that both $\{N_{CCE,2}-\Delta_2, N_{CCE,2}-\Delta_2+1, \ldots, N_{CCE,3}-1\}$ and $\{N_{CCE,1}-\Delta_1, N_{CCE,3}-\Delta_1+1, \ldots, N_{CCE,2}-1-\Delta_2\}$ can form complete RBs.

In the above embodiments, there is a one-to-one mapping relationship between CCEs in the sub-frames and ACK channels, and ACK channel sets that do not overlap each other are reserved for each sub-frame. When it requires reserving ACK channel resources for the feedbacks of N downlink sub-frames in one uplink sub-frame, a large number of resources may be reserved, especially when N takes a great value. For example, as for the 3GPP E-UTRA system, when a downlink-to-uplink ratio is 9:1, and N=9, one ACK channel is reserved for each CCE of each sub-frame, resulting in a large overhead.

The following methods may be adopted to solve the problem about a large overhead of the reserved ACK channel resources.

In Method 1, a plurality of downlink sub-frames is mapped to the same ACK channel set, and the one-to-one mapping of CCE labels to ACK channel labels is still adopted in the sub-frames. That is, a plurality of downlink sub-frames is assigned with the same mapping label d in the mapping process. For the downlink sub-frames assigned with the same mapping label d, the number of reserved ACK channels is no less than a maximum number of CCEs of any one of the downlink sub-frames. For the 3GPP E-UTRA system, this means that if the special sub-frame and ordinary downlink sub-frames are assigned with the same mapping label d, $N_{CCE,3}$ ACK channels exist in the corresponding ACK channel set thereof.

The BS may notify the user of the assignment of the mapping label d through a high-level signaling, for example, by broadcasting.

The BS and the UE determine an ACK channel label $n_{PUCCH}^{(1)}$ mapped to a CCE with a label of $n_{CCE}$ in the sub-frame with the label of d according to the following process: firstly, according to the value of $n_{CCE}$, it is determined that a mapped ACK channel belongs to a sub-block with a label of m in the sub-frame with the label of d, for example, for the 3GPP E-UTRA system, the determination process includes selecting a value of m from m∈{0, 1, 2} to satisfy Equation (1) $N_{CCE,m} \leq n_{CCE} \leq N_{CCE,m+1}-1$; and then, the value of m obtained in the above step is substituted into Equation (2) $n_{PUCCH}^{(1)} = (N-d-1) \times N_{CCE,m} + d \times N_{CCE,m+1} + n_{CCE}$ to calculate the assigned ACK channel label.

In Method 2, ACK channel sets that do not overlap each other are reserved for each downlink sub-frame, but the one-to-one mapping of CCE labels to ACK channel labels is not adopted in the sub-frames, and instead, a plurality of CCEs may be assigned with the same ACK channel. A commonly used method is to reserve one ACK channel for every K CCEs with consecutive labels. The specific steps are listed as follows.

$$N \times \text{INTEGER}(N_{CCE,max\{Mi\}}/K) \text{ or } \sum_{i=0}^{N-1} \text{INTEGER}(N_{CCE,Mi}/K)$$

channels reserved for N downlink sub-frames are divided into N blocks, and each block contains $\text{INTEGER}(N_{CCE,max\{Mi\}}/K)$ or $\text{INTEGER}(N_{CCE,Mi}/K)$ channels. Each downlink sub-frame is assigned with a mapping label d according to a preset rule, and each mapping label corresponds to one block. INTEGER( ) represents a rounding operation, and may be a round up operation ⌈ ⌉ or a round down operation ⌊ ⌋. It can be seen that, when K is greater than 1, the number of ACK channels to be reserved is reduced to 1/K of the number of CCEs, so K may also be referred to as an ACK resource reduction factor.

When a total number of $N \times \text{INTEGER}(N_{CCE,max\{Mi\}}/K)$ channels are reserved, i.e., $\text{INTEGER}(N_{CCE,max\{Mi\}}/K)$ ACK channels are reserved for each downlink sub-frame, each block is divided into max{Mi} sub-blocks, and a sub-block with a label of m contains $\text{INTEGER}(N_{CCE,m+1}/K) - \text{INTEGER}(N_{CCE,m}/K)$ ACK channels, in which 0≤m<max{Mi}. When a total number of $$\sum_{i=0}^{N-1} \text{INTEGER}(N_{CCE,Mi}/K)$$

channels are reserved, i.e., $\text{INTEGER}(N_{CCE,Mi}/K)$ ACK channels are reserved for each downlink sub-frame, each block is divided into Mi sub-blocks, and a sub-block with a label of m contains $\text{INTEGER}(N_{CCE,m+1}/K) - \text{INTEGER}(N_{CCE,m}/K)$ ACK channels, in which 0≤m<Mi.

All ACK channels are mapped to the sub-blocks and arranged according to a sequence of increasing the mapping label d first and then increasing the sub-block label m. For the 3GPP E-UTRA system, one PDCCH may be formed by 1, 2, 4, or 8 CCEs, so K is recommended to take values in non-empty subsets of a set {1, 2, 4, 8}, and the specific value of K is notified by the BS to the user through a high-level signaling.

The BS and the UE determine an ACK channel label $n_{PUCCH}^{(1)}$ mapped to a CCE with a label of $n_{CCE}$ in the sub-frame with the label of d according to the following process: firstly, according to the value of $n_{CCE}$, it is determined that a mapped ACK channel belongs to a sub-block with a label of m in the sub-frame with the label of d, for example, for the 3GPP E-UTRA system, the determination process includes selecting a value of m from m∈{0, 1, 2} to satisfy Equation (3) $\text{INTEGER}(N_{CCE,m}/K) \times K \leq n_{CCE} \leq \text{INTEGER}(N_{CCE,m+1}/K) \times K - 1$; and then, the value of m obtained in the above step is substituted into Equation (4) $n_{PUCCH}^{(1)} = (N-d-1) \times \text{INTEGER}(N_{CCE,m}/K) + d \times \text{INTEGER}(N_{CCE,m+1}/K) + \lfloor n_{CCE}/K \rfloor$ to calculate the assigned ACK channel label. When K=1, Equations (3) and (4) are simplified to be Equations (1) and (2) respectively.

In Method 2, a mode of mapping a plurality of CCEs to the same ACK channel is adopted for some sub-frames, and a mode of mapping each CCE to a different ACK channel (i.e., the one-to-one mapping mode of CCE labels to ACK channel labels) is adopted for the other sub-frames.

In Method 2, when INTEGER( ) specifically represents the round down operation ⌊ ⌋, several CCEs remained after K is rounded down in the sub-frames may have no corresponding ACK channels. For example, when $\lfloor N_{CCE,Mi}/K \rfloor$ ACK channels are reserved for the sub-frame with the label of i, if $N_{CCE,Mi}$ cannot be exactly divided by K, only CCEs with labels of $0 \sim \lfloor N_{CCE,Mi}/K \rfloor \times K - 1$ can be mapped to the ACK channels, and the other CCEs with labels of $\lfloor N_{CCE,Mi}/K \rfloor \times K \sim N_{CCE,Mi}$ cannot be mapped to the ACK channels according to Equations (3) and (4). Therefore, at the BS side, the CCEs with the labels of $\lfloor N_{CCE,Mi}/K \rfloor \times K \sim N_{CCE,Mi}-1$ are not assigned as initial CCEs occupied by a PDCCH carrying a downlink scheduling assignment authorization command.

In Method 1, certain limitations may be imposed to avoid a collision between ACK channels for a plurality of downlink sub-frames assigned with the same mapping label d. For example, it is limited that among CCEs with the same label in the plurality of downlink sub-frames assigned with the same mapping label d, at most one CCE is taken as the initial CCE occupied by the PDCCH carrying the downlink scheduling assignment authorization command.

In Method 2, certain limitations may also be imposed to avoid a collision between ACK channels in the sub-frames after the mapping process. For example, it is limited that among every K CCEs with consecutive labels, at most one CCE is taken as the initial CCE occupied by the PDCCH carrying the downlink scheduling assignment authorization command. A simple implementation method is limiting labels of initial CCEs occupied by all PDCCHs carrying the downlink scheduling assignment authorization command to be multiples of K.

The effects of the mapping process using Equations (3) and (4) are illustrated below through specific examples. As Equations (1) and (2) are special cases of Equations (3) and (4) when K=1, no example is particularly provided for Equations (1) and (2) below.

As shown in Table 1, under the situation that the system bandwidth is 20 MHz and 2 antennas are configured, and n takes values of 1, 2, and 3, $N_{CCE,1}=17$, $N_{CCE,2}=50$, and $N_{CCE,3}=84$. In this example, the number of downlink sub-frames that need to feed back ACKs in one uplink sub-frame is 3, i.e., N=3, and the three sub-frames are all ordinary sub-frames. Therefore, ACK channel labels mapped to CCE labels of each sub-frame by using Equations (3) and (4) are respectively shown in Tables 2, 3, 4, and 5 when K=1, 2, 4, and 8, and INTEGER( ) specifically represents the round up operation $\lceil \ \rceil$.

TABLE 2

$K = 1, N = 3, N_{CCE,1} = 17, N_{CCE,2} = 50, N_{CCE,3} = 84$

| Sub-frame d | CCE label in sub-frame | ACK channel label |
|---|---|---|
| d = 0 | 0~16 | 0~16 |
|  | 17~49 | 51~83 |
|  | 50~83 | 150~183 |
| d = 1 | 0~16 | 17~33 |
|  | 17~49 | 84~116 |
|  | 50~83 | 184~217 |
| d = 2 | 0~16 | 34~50 |
|  | 17~49 | 117~149 |
|  | 50~83 | 218~251 |

TABLE 3

$K = 2, N = 3, N_{CCE,1} = 17, N_{CCE,2} = 50, N_{CCE,3} = 84$

| Sub-frame d | CCE label in sub-frame | ACK channel label |
|---|---|---|
| d = 0 | 0~17 | 0~8 |
|  | 18~49 | 27~42 |
|  | 50~83 | 75~91 |
| d = 1 | 0~17 | 9~17 |
|  | 18~49 | 43~58 |
|  | 50~83 | 92~108 |
| d = 2 | 0~17 | 18~26 |
|  | 18~49 | 59~74 |
|  | 50~83 | 109~125 |

TABLE 4

$K = 4, N = 3, N_{CCE,1} = 17, N_{CCE,2} = 50, N_{CCE,3} = 84$

| Sub-frame d | CCE label in sub-frame | ACK channel label |
|---|---|---|
| d = 0 | 0~19 | 0~4 |
|  | 20~51 | 15~22 |
|  | 52~83 | 39~46 |
| d = 1 | 0~19 | 5~9 |
|  | 20~51 | 23~30 |
|  | 52~83 | 47~54 |
| d = 2 | 0~19 | 10~14 |
|  | 20~51 | 31~38 |
|  | 52~83 | 55~62 |

TABLE 5

$K = 8, N = 3, N_{CCE,1} = 17, N_{CCE,2} = 50, N_{CCE,3} = 84$

| Sub-frame d | CCE label in sub-frame | ACK channel label |
|---|---|---|
| d = 0 | 0~23 | 0~2 |
|  | 24~55 | 9~12 |
|  | 56~83 | 21~24 |
| d = 1 | 0~23 | 3~5 |
|  | 24~55 | 13~16 |
|  | 56~83 | 25~28 |
| d = 2 | 0~23 | 6~8 |
|  | 24~55 | 17~20 |
|  | 56~83 | 29~32 |

As seen from the data in Tables 2-5 that, the greater the value of K is, the less ACK channels need to be assigned, so that the overhead on ACK channel resources is reduced.

Those of ordinary skill in the art should understand that, all or a part of the steps in the above embodiments can be implemented by relevant hardware under an instruction of a program, and the program may be stored in a computer-readable storage medium, such as a read-only memory (ROM) or a random access memory (RAM), a magnetic disk, or an optical disk.

It should be understood that, although the steps of the methods are sequentially described in the above descriptions for the convenience of understanding, the sequence of the above steps is not strictly limited.

Figure 7:
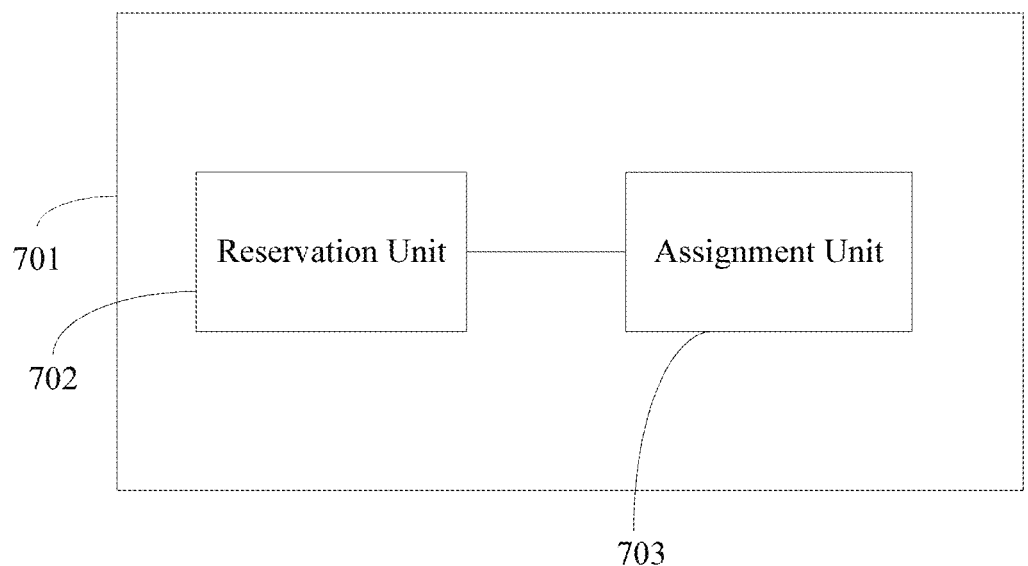
FIG. 7 is a schematic structural view of a device according to an embodiment of the present invention.

In an embodiment, a device 701 for assigning ACK channels to a user is as shown in FIG. 7. The device 701 includes a reservation unit 702 and an assignment unit 703. The reservation unit 702 is configured to reserve channels for each downlink sub-frame (including the special sub-frame), for example, INTEGER($N_{CCE,max\{Mi\}}$/K) or INTEGER ($N_{CCE,Mi}$/K) ACK channels are reserved for each sub-frame, i.e., a total number of $$N \times \text{INTEGER}(N_{CCE,max\{Mi\}}/K) \text{ or } \sum_{i=0}^{N-1} \text{INTEGER}(N_{CCE,Mi}/K)$$

channels are reserved. The assignment unit 703 is configured to assign the reserved ACK channels to the N downlink sub-frames. Specifically, the assignment unit 703 divides the reserved ACK channels into N blocks; assigns each downlink sub-frame with a mapping label d according to a preset rule, in which each mapping label corresponds to one block; divides each block into a plurality of sub-blocks; and assigns the ACK channels to each downlink sub-frame according to a sequence of increasing the mapping label d first and then increasing a sub-block label m. The preset rule may be a mapping mode in which the special sub-frame is placed at the last position, or a mapping mode in which the sub-frame with the maximum actual value of n is placed at the foremost position, especially a mapping mode in a sequence from the maximum actual value of n to the minimum actual value of n for the sub-frames.

During the process of dividing each block into a plurality of sub-blocks, when INTEGER($N_{CCE,max\{Mi\}}$/K) channels are reserved for each sub-frame, each block is divided into max{Mi} sub-blocks, and a sub-block with a label of m contains INTEGER($N_{CCE,m+1}$/K)−INTEGER($N_{CCE,m}$/K) channels; and when INTEGER($N_{CCE,Mi}$/K) channels are reserved for each sub-frame, each block is divided into Mi sub-blocks, and a sub-block with a label of m contains INTEGER($N_{CCE,m+1}$/K)−INTEGER($N_{CCE,m}$/K) channels.

An assignment mode may be as follows.

The ACK channels are assigned to the downlink sub-frames in a mode of mapping K consecutive CCEs to one ACK channel; alternatively, the ACK channels are assigned to the downlink sub-frames in a mode of mapping a plurality of downlink sub-frames to the same ACK channel set.

Alternatively, when each block is divided into max{Mi} sub-blocks, CCE sets with labels of {0, 1, . . . , $N_{CCE,1}$−1−Δ1}, {$N_{CCE,1}$−Δ1, $N_{CCE,1}$−Δ1+1, . . . , $N_{CCE,2}$−1−Δ2}, . . . , {$N_{CCE,Mi-1}$−ΔMi−1, $N_{CCE,Mi-1}$−ΔMi−1+1, . . . , $N_{CCE,Mi}$−1} within the same sub-frame are respectively mapped to different sub-blocks; when each block is divided into Mi sub-blocks, CCE sets with labels of {0, 1, . . . , $N_{CCE,1}$−1−Δ1}, {$N_{CCE,1}$−Δ1, $N_{CCE,1}$−Δ1+1, . . . , $N_{CCE,2}$−1−Δ2}, . . . , {$N_{CCE,Mi-1}$−ΔMi−1, $N_{CCE,Mi-1}$−ΔMi−1+1, . . . , $N_{CCE,Mi}$−1} within the same sub-frame are respectively mapped to different sub-blocks.

In another embodiment, the reservation unit 702 is configured to reserve $N_{CCE,max\{Mi\}}$ or $N_{CCE,Mi}$ ACK channels for each downlink sub-frame, and the assignment unit 703 is configured to assign the ACK channels to the downlink sub-frames in a mode of consecutively mapping ACK channels to each sub-frame among the reserved ACK channels.

Figure 8:
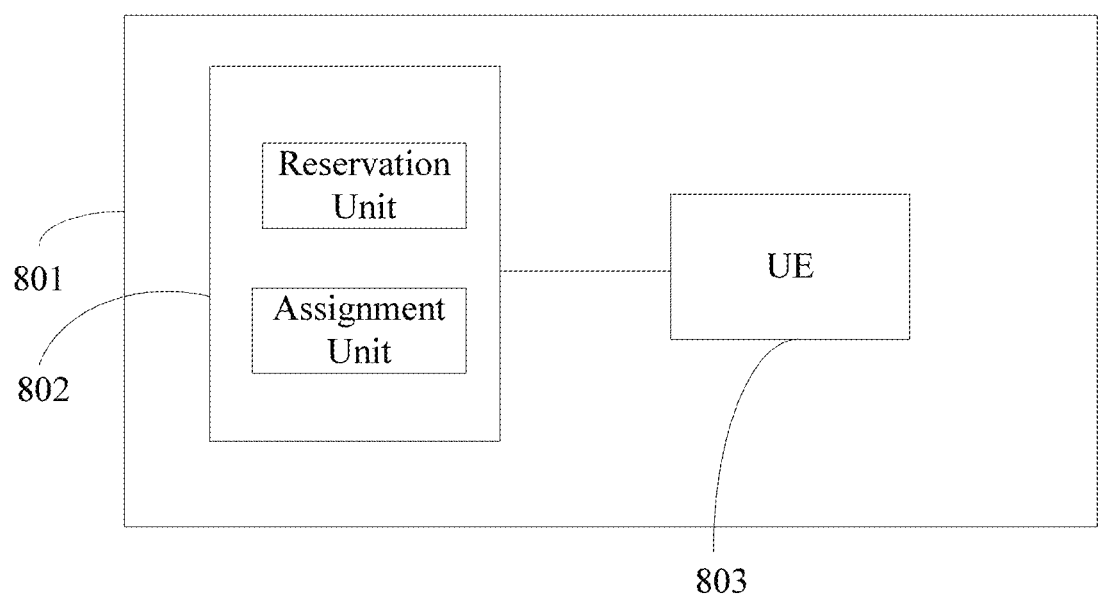
FIG. 8 is a schematic structural view of a system according to an embodiment of the present invention.

In an embodiment, a communication system 801 is provided, as shown in FIG. 8. The communication system 801 includes a device 802 for assigning ACK channels to a user and a UE 803. The device 802 further includes a reservation unit and an assignment unit, which respectively have the same functions as the reservation unit 802 and the assignment unit 803. The device 802 is located at a network side, for example, in a BS at the network side. As the UE has already acquired a rule for assigning ACK channels in advance, the UE directly feeds back ACK information of N downlink sub-frames to the network side through the assigned ACK channels.

It should be understood that, the devices or units in the accompanying drawings (or in the embodiments) are merely exemplary and represent logical structures, among which the units shown as separate components may be or may not be physically separated, and the components shown as units may be or may not be physical units, that is, may be located at one position or distributed to a plurality of network units.

The accompanying drawings and relevant descriptions are merely intended to illustrate the principle of the present invention, but not to limit the scope of the present invention. For example, although the embodiments are described based on the 3GPP TDD system, the technical solution of the present invention is also applicable to other networks or systems, for example, half-duplex FDD (HD-FDD), as long as it requires feeding back ACKs/NACKs of a plurality of downlink sub-frames in one uplink sub-frame. Therefore, any modification, equivalent variation, or improvement made without departing from the principle of the present invention fall within the scope of the present invention.

What is claimed is:

1. A method for receiving acknowledgement/negative-acknowledgement (ACK/NACK) information by a base station, comprising:
   obtaining a label $n_{PUCCH}^{(1)}$ of an ACK channel of a control channel element (CCE) in a downlink sub-frame with a label of d among N downlink sub-frames based upon: $(N-d-1) \times N_{CCE,m}$, $d \times N_{CCE,m+1}$ and $n_{CCE}$,
   wherein $m \in \{0, 1, \ldots, \max\{Mi\}-1\}$ and $N_{CCE,m} \leq n_{CCE} \leq N_{CCE,m+1}-1$,
   the $n_{CCE}$ is a label of the CCE,
   the $N_{CCE,m}$ represents a number of CCEs in the downlink sub-frame when the number of symbols used for transmission of a physical downlink control channel (PDCCH) is equal to m,
   the $N_{CCE,m+1}$ represents a number of CCEs in the downlink sub-frame when the number of symbols used for transmission of the PDCCH is equal to m+1,
   the $\max\{Mi\}$ represents a number of symbols used for transmission of the PDCCH,
   and N is a positive integer, $0 \leq d < N$; and
   receiving the ACK/NACK information on the ACK channel with the label $n_{PUCCH}^{(1)}$.

2. The method according to claim 1, wherein the $n_{PUCCH}^{(1)}$ is a sum of components including $(N-d-1) \times N_{CCE,m}$, $d \times N_{CCE,m+1}$ and the $n_{CCE}$.

3. The method according to claim 1, wherein the CCE corresponding to the $n_{CCE}$ in the downlink sub-frame is an initial CCE occupied by the PDCCH.

4. A method for transmitting acknowledgement/negative-acknowledgement (ACK/NACK) information by a user equipment, comprising:
   obtaining, a label $n_{PUCCH}^{(1)}$ of an ACK channel of a control channel element (CCE) in a downlink sub-frame with a label of d among N downlink sub-frames based upon:
   $(N-d-1) \times N_{CCE,m}$, $d \times N_{CCE,m+1}$ and $n_{CCE}$,
   wherein $m \in \{0, 1, \ldots, \max\{Mi\}-1\}$ and $N_{CCE,m} \leq n_{CCE} \leq N_{CCE,m+1}-1$,
   the $n_{CCE}$ is a label of the CCE,
   the $N_{CCE,m}$ represents a number of CCEs in the downlink sub-frame when the number of symbols used for transmission of a physical downlink control channel (PDCCH) is equal to m,
   the $N_{CCE,m+1}$ represents a number of CCEs in the downlink sub-frame when the number of symbols used for transmission of the PDCCH is equal to m+1,
   the $\max\{Mi\}$ represents a number of symbols used for transmission of the PDCCH,
   N is a positive integer, $0 \leq d < N$; and
   transmitting the ACK/NACK information on the ACK channel with the label $n_{PUCCH}^{(1)}$.

5. The method according to claim 4, wherein the $n_{PUCCH}^{(1)}$ is a sum of components including $(N-d-1) \times N_{CCE,m}$, $d \times N_{CCE,m+1}$ and the $n_{CCE}$.

6. The method according to claim 4, wherein the CCE corresponding to the $n_{CCE}$ in the downlink sub-frame is an initial CCE occupied by the PDCCH.

7. A base station, comprising:
   a processor that obtains a label $n_{PUCCH}^{(1)}$ of an acknowledgement (ACK) channel of a control channel element (CCE) in a downlink sub-frame with a label of d among N downlink sub-frames based upon $(N-d-1) \times N_{CCE,m}$, $d \times N_{CCE,m+1}$ and $n_{CCE}$, wherein $m \in \{0, 1, \ldots, \max\{Mi\}-1\}$ and $N_{CCE,m} \leq n_{CCE} \leq N_{CCE,m+1}-1$,
   the $n_{CCE}$ is a label of the CCE,
   the $N_{CCE,m}$ represents a number of CCEs in the downlink sub-frame when a the number of symbols used for transmission of a physical downlink control channel (PDCCH) is equal to m,
   the $N_{CCE,m+1}$ represents the number of CCEs in the downlink sub-frame when the number of symbols used for transmission of the PDCCH is equal to m+1,
   the $\max\{Mi\}$ represents the number of symbols used for transmission of the PDCCH,
   N is a positive integer, $0 \leq d < N$; and
   a receiver that receives acknowledgement/negative-acknowledgement (ACK/NACK) information on the ACK channel with the label $n_{PUCCH}^{(1)}$.

8. The base station according to claim 7, wherein the $n_{PUCCH}^{(1)}$ is a sum of components including $(N-d-1) \times N_{CCE,m}$, $d \times N_{CCE,m+1}$ and the $n_{CCE}$.

9. The base station according to claim 7, wherein the CCE corresponding to the $n_{CCE}$ in the downlink sub-frame is an initial CCE occupied by the PDCCH.

10. A user equipment, comprising:
    a processor that obtains a label $n_{PUCCH}^{(1)}$ of an acknowledgement (ACK) channel of a control channel element (CCE) in a downlink sub-frame with a label of d among N downlink sub-frames based upon $(N-d-1) \times N_{CCE,m}$, $d \times N_{CCE,m+1}$ and $n_{CCE}$, wherein $m \in \{0, 1, \ldots, \max\{Mi\}-1\}$ and $N_{CCE,m} \leq n_{CCE} \leq N_{CCE,m+1}-1$,
    the $n_{CCE}$ is a label of the CCE,
    the $N_{CCE,m}$ represents a number of CCE in the downlink sub-frame when the number of symbols used for transmission of a physical downlink control channel (PDCCH) is equal to m, the $N_{CCE,m+1}$ represents a number of CCE in the downlink sub-frame when the number of symbols used for transmission of the PDCCH is equal to m+1, the max{Mi} represents a number of symbols used for transmission of the PDCCH, N is a positive integer, 0≤d<N; and a transmitter that transmits acknowledgement/negative-acknowledgement (ACK/NACK) information on the ACK channel with the label $n_{PUCCH}^{(1)}$.

11. The user equipment according to claim 10, wherein the $n_{PUCCH}^{(1)}$ is a sum of components including (N−d−1)× $N_{CCE,m}$, $d \times N_{CCE,m+1}$ and the $n_{CCE}$.

12. The user equipment according to claim 10, wherein the CCE corresponding to the $n_{CCE}$ in the downlink sub-frame is an initial CCE occupied by the PDCCH.

* * * * *